Oct. 6, 1936.  E. C. ERRO  2,056,843
ORANGE PEELER
Filed July 22, 1935
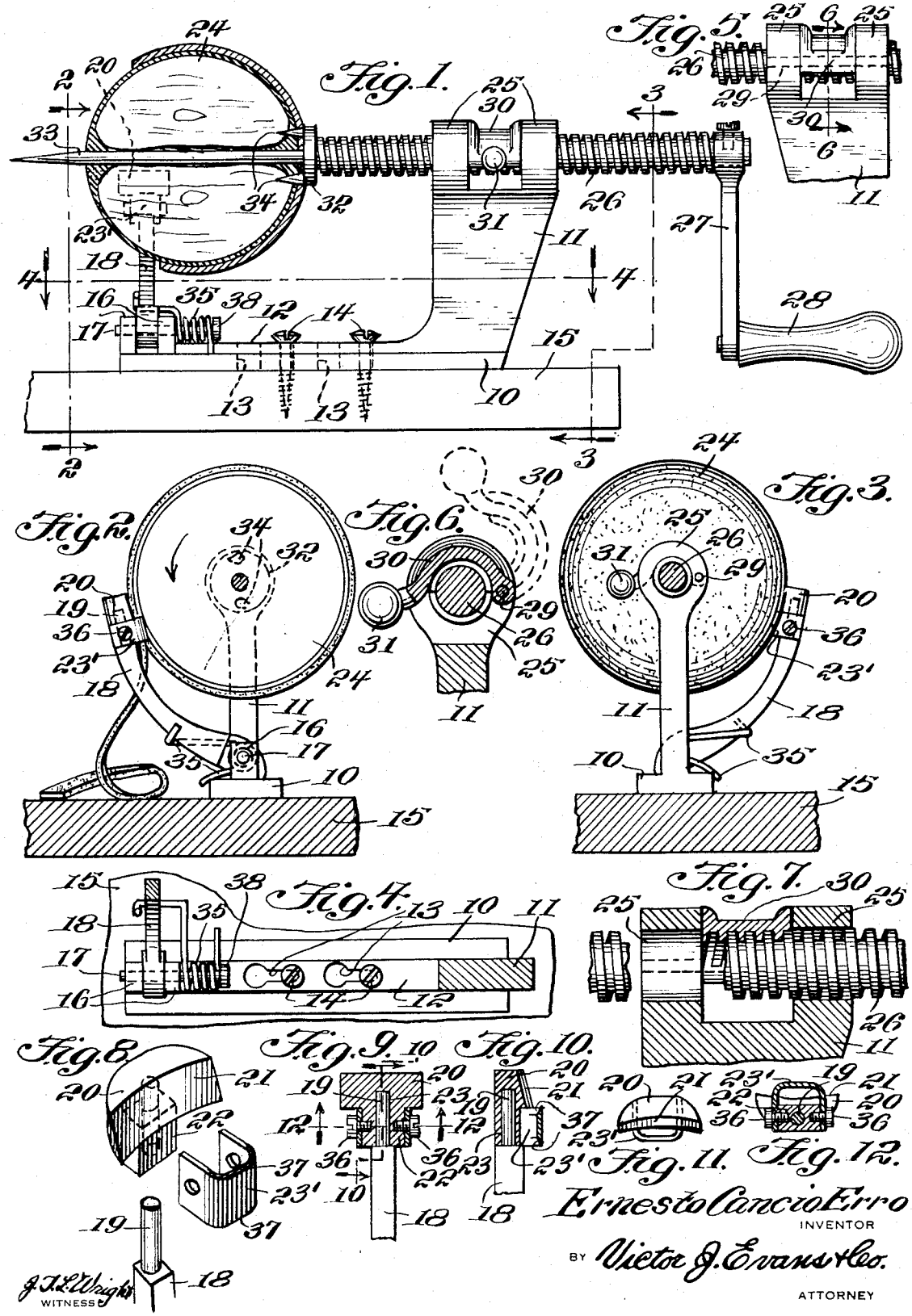
Ernesto Cancio Erro
INVENTOR
BY Victor J. Evans & Co.
ATTORNEY Patented Oct. 6, 1936

2,056,843

UNITED STATES PATENT OFFICE 2,056,843

ORANGE PEELER

Ernesto Cancio Erro, Habana, Cuba

Application July 22, 1935, Serial No. 32,673

1 Claim. (Cl. 146—3)

The invention relates to a device for peeling fruit, potatoes or the like and more especially to an orange peeler.

The primary object of the invention is the provision of a device of this character, wherein through the use of a screw spindle and a knife the fruit, potato or the like can be readily and conveniently peeled, the knife being of special construction and mounted in a novel manner so as to be presented to the fruit, potato or the like for the peeling operation on the rotation and advancement of such fruit, potato or the like, the carrier for the knife being readily removable so that it can be cleaned and the device maintained sanitary.

Another object of the invention is the provision of a device of this character, wherein the feed spindle is latched in a bearing so that on the unlatching thereof the said spindle can be adjusted with dispatch within said bearing, the knife being automatically adjustable for proper relation thereof with the fruit, potato or the like to be peeled.

A further object of the invention is the provision of a device of this character, which is simple in construction, positive and automatic in its operation yet manually driven, thoroughly reliable and efficient in its purpose, strong, durable and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a side elevation of a device constructed in accordance with the invention showing an orange in vertical section and within the device for the peeling thereof.

Figure 2 is a sectional view on the line 2—2 of Figure 1 looking in the direction of the arrows.

Figure 3 is a sectional view on the line 3—3 of Figure 1 looking in the direction of the arrows.

Figure 4 is a sectional view on the line 4—4 of Figure 1 looking in the direction of the arrows.

Figure 5 is a fragmentary side elevation of the bearing with a latch for the screw spindle.

Figure 6 is a sectional view on the line 6—6 of Figure 5 looking in the direction of the arrows.

Figure 7 is a vertical longitudinal sectional view through the bearing and latch.

Figure 8 is an exploded perspective view showing in detail the carrier, knife and supporting arm of the device.

Figure 9 is a vertical transverse sectional view through the carrier.

Figure 10 is a sectional view on the line 10—10 of Figure 9 looking in the direction of the arrows.

Figure 11 is a top plan view of the carrier.

Figure 12 is a sectional view on the line 12—12 of Figure 9 looking in the direction of the arrows.

Similar reference characters indicate corresponding parts throughout the several views in the drawing.

Referring to the drawing in detail, the device comprises a base 10 for supporting an upstanding bearing 11, it having a foot extension 12 provided with keyhole shaped slots 13 spaced from each other for the reception of screws or the like fasteners 14 which are passed through the base 10 and engaged in a support, a portion 15 thereof being shown and is in the nature of a table top, bench or the like.

The base 10 has formed therewith spaced transversely arranged pivot ears 16, these being remote from the bearing 11 when engaged upon the base 10. Between these ears 16 and connected thereto by a pivot pin 17 is a swinging arm 18 it having an outward curvature and has at its upper free end a pin-like arbor 19 for the mounting thereon of a knife carrier in the nature of a block 20, it having a concaved or curved downwardly sloping contact face 21 and also a flat faced reduced lower portion 22, the arbor 19 being loosely fitted in or received by a companion socket 23 pinned in the block centrally thereof and opening only through the bottom side of the lower portion 22 of the said block 20 so that the latter will be swiveled on the upper free end of the arm 18.

Detachably mounted upon the lower portion 22 of the block 20 is a substantially U-shaped peeling knife 23 which is held in a position for confronting fruit such as an orange 24 for the automatic peeling thereof while the block 20 at the face 21 has contact with the said orange 24 and functions to automatically adjust the knife 23 correspondingly to the undulations or irregular outer surface of the orange when being automatically peeled.

The bearing 11 is formed with the circular eyes 25, these being spaced from each other and have loosely passing therethrough a screw spindle 26 which at the outer end has detachably fixed thereto a handle crank 27 carrying the handle 28. Pivoted between the eyes 25 of the bearing 11 at 29 is a swinging half nut 30 which when in threaded engagement with the spindle 26 latches it in the bearing for screw movement therethrough when turned by the crank 27. This half nut 30 is formed with a finger knob 31 which protrudes laterally from one side of the bearing 11 to be readily accessible so that upon swinging of the nut 30 upwardly and laterally the screw spindle 26 will be unlatched and it can be shifted or slidably moved through the eyes 25 of the bearing 11 freely for quick adjustment of the said spindle.

On the inner end of the spindle 26 is formed a circular head 32, it having protruding therefrom a spear or carrying pin 33 which is forced through the orange 24 at the center core thereof while the head 32 has projecting therefrom holding spurs or pointed lugs 34 which grip the orange 24 to have the same fixed on the spear or pin 33 to avoid free turning of the orange upon the latter while the spindle 26 will rotate the orange and also advance the same so that when the knife 23 is in cutting position it will peel the orange automatically as the said spindle 26 is rotated and advanced in the bearing 11.

The arm 18 having the block 20 swiveled on the arbor 19 thereof is tensioned to advance the knife 23 toward and against the fruit, such as the orange 24, by means of a tensioning spring 35, it being carried by the pivot pin 17 and has one end fixed against the base 10 and the other end against the arm 18, respectively.

The block 20 automatically adjusts itself when the knife is in working position and confronts the fruit to be peeled because the working face 21 of this block under the contour thereof and contact with the fruit will properly hold and maintain the knife 23 in cutting relation to the said fruit or the like for the peeling operation of the device.

The knife 23 is detachably secured to the lower portion 22 at opposite sides thereof by fasteners 36 and this mounting of the said knife will avoid clogging during the peeling operation, the knife 23 being provided with the cutting edges 37 so that when one edge becomes dull the knife can be reversed to present a sharp cutting edge to the work.

The spring 35 is coiled about the pin 17 and is held thereon by a head 38 formed on said pin.

The device is manually driven by the crank 27 and the screw spindle 26 feeds the fruit, potato or the like to be peeled and also rotates the same when confronted by the knife 23 for the peeling operation of the device.

What is claimed is:

A device of the character described, comprising a base, a bearing carried by said base and having a notch forming a relatively wide space, a screw spindle fitted in said bearing and slidable therein, a combined latching and feed nut pivoted on the bearing and operating in said space for releasably engaging said screw spindle, a swinging arm pivoted to the base and movable at right angles to the axis of said screw spindle, a carrier involving a block having a concaved downwardly sloping contact face and a flat faced reduced lower portion, a pivot pin on said arm and having the reduced lower portion journaled thereon, a U-shaped peeling knife straddling said flat faced lower portion and reversibly secured thereon, means on the screw spindle for presenting work to the knife, and a spring active against the arm to hold the knife in working relation to the work and the curved face of the block of the carrier contacting with said work.

ERNESTO CANCIO ERRO.